United States Patent
Matacotta et al.

(10) Patent No.: US 6,514,320 B1
(45) Date of Patent: Feb. 4, 2003

(54) PROCESS FOR ABSORBING NITROGEN OXIDES FROM GAS MIXTURES CONTAINING SAID OXIDES

(75) Inventors: Francesco Cino Matacotta, Trieste (IT); Petr Nozar, Bologna (IT); Chiara Dionigi, Perugia (IT); Gianluca Calestani, Parma (IT)

(73) Assignees: Consiglio Nazionale Delle Ricerche, Rome (IT); Universita' Degli Studi di Parma, Parma (IT)

( * ) Notice: Subject to any disclaimer, the term of this patent is extended or adjusted under 35 U.S.C. 154(b) by 0 days.

(21) Appl. No.: 09/830,003
(22) PCT Filed: Oct. 19, 1999
(86) PCT No.: PCT/EP99/07898
§ 371 (c)(1), (2), (4) Date: Jul. 2, 2001
(87) PCT Pub. No.: WO00/23175
PCT Pub. Date: Apr. 27, 2000

(30) Foreign Application Priority Data

Oct. 21, 1998 (IT) .......................... B098A0593

(51) Int. Cl.⁷ ............... B01D 53/56; B01J 20/04
(52) U.S. Cl. ...................... 95/129; 423/239.1
(58) Field of Search ............ 95/90, 128, 129; 423/239.1

(56) References Cited

U.S. PATENT DOCUMENTS

| | | | | |
|---|---|---|---|---|
| 5,312,607 A | * | 5/1994 | Schiabel et al. | 252/181.4 |
| 6,066,590 A | * | 5/2000 | Horii et al. | 423/213.5 |
| 6,334,987 B1 | * | 1/2002 | Matacotta et al. | 423/245.3 |
| 6,379,432 B1 | * | 4/2002 | Matacotta et al. | 95/129 |

FOREIGN PATENT DOCUMENTS

| | | | |
|---|---|---|---|
| WO | A-97 02886 | | 1/1997 |
| WO | A-97 28884 | | 8/1997 |
| WO | WO 99/04881 | * | 2/1999 |

\* cited by examiner

*Primary Examiner*—David A. Simmons
*Assistant Examiner*—Frank M. Lawrence

(57) ABSTRACT

A process for absorbing nitrogen oxides, comprising the step of placing gas mixtures containing nitrogen oxides in contact with absorbent compounds constituted by mixed copper oxides chosen among $CaCuO_2$, $Sr_{14}Cu_{24}O_{41}$, derivatives thereof obtained by isovalent and/or heterovalent substitutions, and mixtures thereof.

22 Claims, 13 Drawing Sheets

PROCESS FOR ABSORBING NITROGEN OXIDES FROM GAS MIXTURES CONTAINING SAID OXIDES

Figure 1:
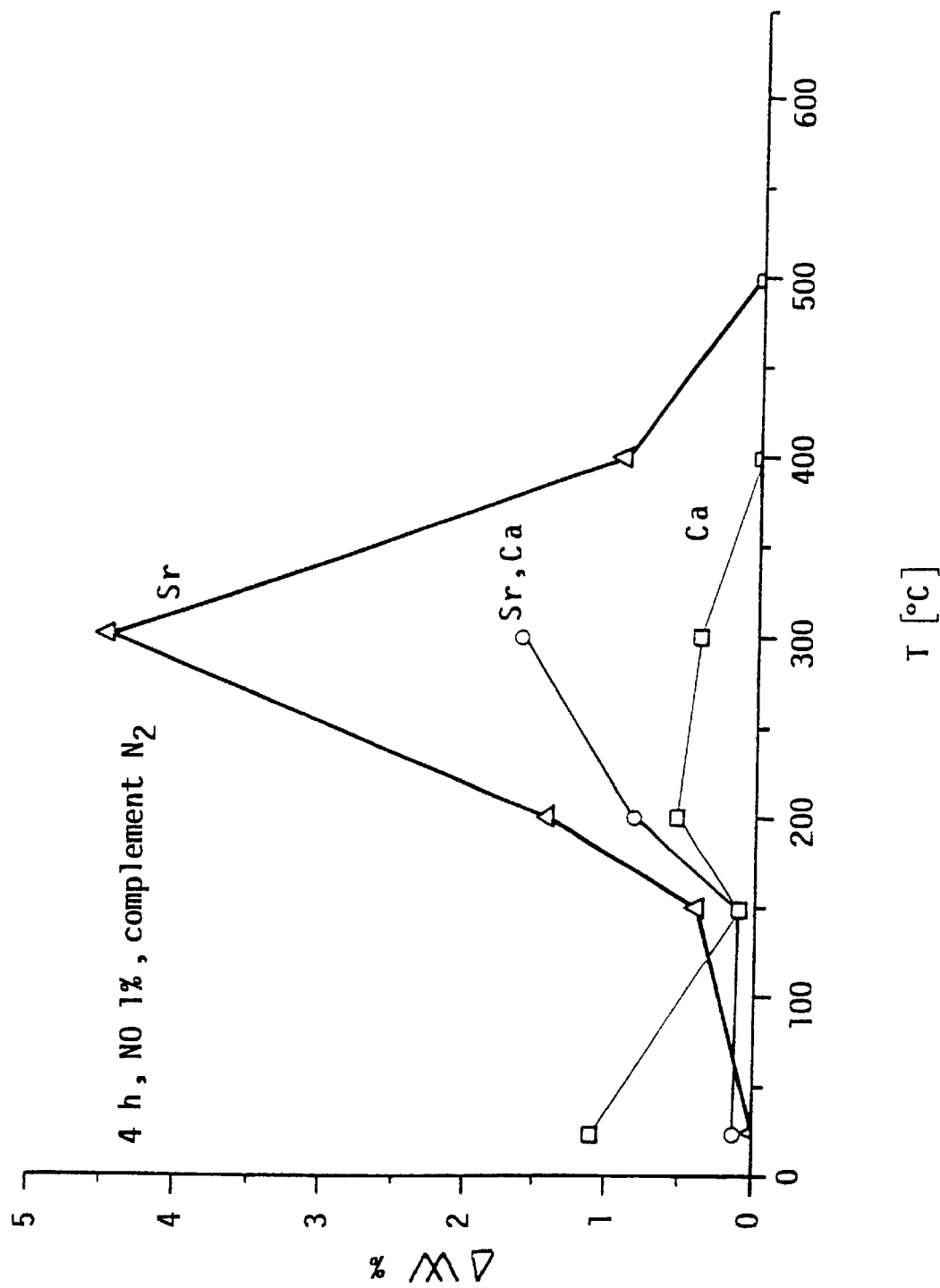

This application is a 371 of PCT application No. PCT/EP99/07898, filed on Oct. 19, 1999.

BACKGROUND OF THE INVENTION

The present invention relates to a process for absorbing nitrogen oxides from gas mixtures containing said oxides. The process according to the present invention is particularly, but not exclusively, useful for removing nitrogen oxides contained in gases produced by combustion processes such as, for example, the gas emissions of thermoelectric power stations, kilns and furnaces for producing cement and ceramic materials, motor vehicle exhausts, and domestic heating system exhausts. These gases are also produced by various specific industrial processes, such as the production of semiconducting materials.

Absorption of nitrogen oxides by Ba—Cu—O mixed oxides has been described in the literature (Masato Machida et al., "NO Removal by Absorption into BaO—CuO Binary Oxides", J Chem Soc Chem Commun, 1990, p. 1165; M. Machida et al., "Catalytically Accelerated Solid Gas Reaction Between NO and Ba—Cu—O for Efficient NO Removal", Proceedings of the 10th International Congress on Catalysts, Jul. 9–24 1992, Budapest, Hungary).

In particular, the activity of reversible absorption of NO of two phases of mixed oxide, $BaCuO_{2.1}$ and $BaCuO_{2.5}$, has been noted.

The main drawback in using $BaCuO_x$ compounds where x=2.1 and x=2.5 is the reactivity of these compounds in the presence of $CO_2$ and $H_2O$, which are unavoidable components of combustion exhaust gases; this reactivity leads to the rapid and irreversible passivation of the nitrogen oxide absorption activity.

Absorption of $NO_x$ by materials based on $BaCuO_2$, such as for example $MnO_2BaCuO_2$, is also known (EP 540280 and EP 580389).

The addition of $MnO_2$, reported as a solution to the above described drawback, has proved itself ineffective, contrary to what has been claimed, as demonstrated by our experiments.

Moreover, WO97/28884 describes the NO and $NO_2$ absorption activity of compounds having the formula $Ba_2Cu_3O_{6\pm d}$, where d has a value between 0 and 1, for example $(Ba_{2-x}A_x)Cu_3O_{6\pm d}$; the same document describes the absorption of nitrogen oxides by $(Ba_{2-x}A_x)Cu_3O_{6\pm d}$ where A is an alkaline or alkaline-earth metal or a lanthanide, for example a compound having the formula e $(Ba_{2-x}Sr_x)Cu_3O_{6\pm d}$.

$Ba_2Cu_3O_{6\pm d}$ compounds absorb nitrogen oxides reversibly and, if synthesized appropriately, are resistant to the action of $CO_2$ and $H_2O$; however, the regeneration temperature is no less than 650° C. and the optimum absorption temperature is close to 300° C. These values can constitute a considerable technological complication in using said materials. Furthermore, the high relative density of the compound, caused by the presence of a relatively heavy ion such as Ba, reduces the effectiveness of the absorbent, which can be expressed as the mass of $NO_x$ absorbed to saturation per gram of absorbent.

SUMMARY OF THE INVENTION

The aim of the present invention is to eliminate the above-mentioned drawbacks in various known processes for absorbing nitrogen oxides from gas mixtures which comprise said oxides by devising a process which allows to absorb nitrogen oxides at lower temperatures with equal efficiency.

An object of the present invention is to provide a nitrogen oxide absorption process in which the regeneration temperature of the absorbent is lower, accordingly ensuring an important technological advantage.

Another object of the present invention is to provide a process for absorbing nitrogen oxides at ambient temperature, albeit with reduced kinetics.

Another object of the present invention is to provide a process for absorbing nitrogen oxides which uses absorbent materials which are resistant to carbonatation if exposed to atmospheres similar to those of flue gas ducts (10% $CO_2$, 10% $H_2O$).

This aim, these objects and others are achieved by the process according to the present invention, which comprises the step of placing a gas mixture containing nitrogen oxides in contact with absorbent compounds comprising or constituted by mixed copper oxides chosen among $CaCuO_2$, $Sr_{14}Cu_{24}O_{41}$ derivatives thereof obtained by isovalent and/or heterovalent substitutions, and mixtures thereof. Advantageously, the $CaCuO_2$ and $Sr_{14}Cu_{24}O_{41}$ derivatives are derived by isovalent and/or heterovalent substitutions both on the sites occupied by the metals of the second group (for example Sr or Mg on Ca in $CaCuO_2$ and Ca, La, Na on Sr in $Sr_{14}Cu_{24}O_{41}$) and on the sites occupied by copper (for example fourth-period transition metals such as Ni).

Selective NO and $NO_2$ absorption properties have been found unexpectedly in $CaCuO_2$ and $Sr_{14}Cu_{24}O_{41}$ compounds and in compounds derived therefrom by isovalent and heterovalent substitutions on the sites occupied by metals of the second group.

Both compounds and their derivatives obtained by substitution are known in the literature (for $CaCuO_2$, Roth et al., J Am Ceram Soc, Vol. 72, p. 1545 (1989), JCPDS card no. 46-0054; for $Sr_{14}Cu_{24}O_{41}$, McCarron et al., Mat Res Bull, Vol. 23, p. 1355 (1988), JCPDS card no. 43-0025); in particular, for the $Sr_{14}Cu_{24}O_{41}$ compound there is a considerable body of literature associated with its unusual magnetic properties.

Hereinafter, when referring to the $CaCuO_2$ and $Sr_{14}Cu_{24}O_{41}$ compounds, such reference is to be understood as a reference to compounds which produce powder diffraction spectra corresponding to JCPDS card no. 46-0054 for $CaCuO_2$ and, JCPDS card no. 43-0025 for $Sr_{14}Cu_{24}O_{41}$, respectively.

However, no reference to the absorption properties of these materials or to their use in any application thereof has been noted.

The following examples are provided by way of illustration, merely to allow fuller understanding of the present invention. Such examples are not intended to limit the embodiment of the invention in any way.

In order to characterize the nitrogen oxide absorption properties of compounds of the $CaCuO_2$ and $Sr_{14}Cu_{24}O_{41}$ types, two different series of experiments were conducted using material synthesized by means of processes described in the literature by Roth et al. and McCarron et al.:

A. Experiments in isothermal conditions with variable time, in order to characterize the absorption kinetics at different temperatures.

B. Experiments with a temperature ramp, in order to characterize the efficiency and reversibility of the absorption and desorption processes.

All the experiments were repeated using the following gas mixtures:

1) 1% NO, $N_2$ complement;
2) 0.8% NO, 5% $O_2$, $N_2$ complement;
3) 0.5% NO, 5% $O_2$, 3% $H_2O$, $N_2$ complement.

It is noted that in the presence of oxygen, part of the NO is oxidated to $NO_2$ until equilibrium for the set composition is reached.

A. Experiments in Isothermal Conditions

Experiments in isothermal conditions were conducted by using a fixed bed of about 0.3 g of absorbent material contained in suitable quartz holders and placed at the center of a quartz tubular reactor in which the gas mixture flowed (80–150 ml/min). The reactor was placed in the hot section of a furnace with electronic temperature control.

Mixtures of gases having the above specified compositions 1), 2) and 3) were fed for a certain time into the reactor, which was kept at a preset constant temperature. Percentage weight increases caused by absorption of nitrogen oxides by the absorbent compound loaded into the reactor were measured.

The fact that the weight increase was actually due to incorporation of NO and $NO_2$ was verified by subjecting the absorbent compound to solid-state IR spectroscopy after the contact with the gas mixture. Solid-state IR spectroscopy always showed the presence of nitrite and nitrate groups in the materials unloaded from the reactor.

The experiment was repeated at various temperatures, by using the following materials:

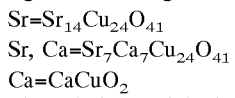

Sr=$Sr_{14}Cu_{24}O_{41}$
Sr, Ca=$Sr_7Ca_7Cu_{24}O_{41}$
Ca=$CaCuO_2$

Figure 2:
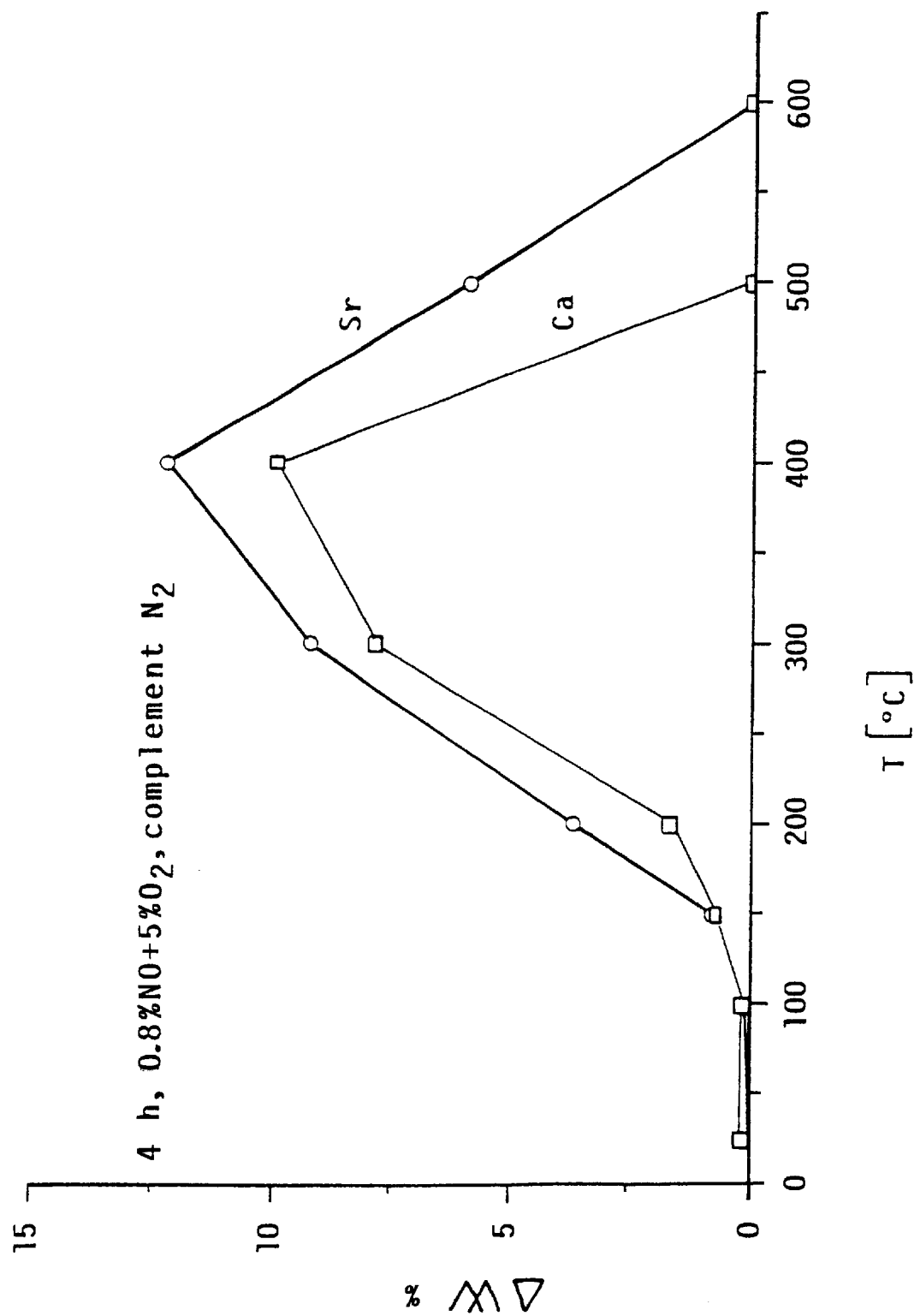
Figure 3:
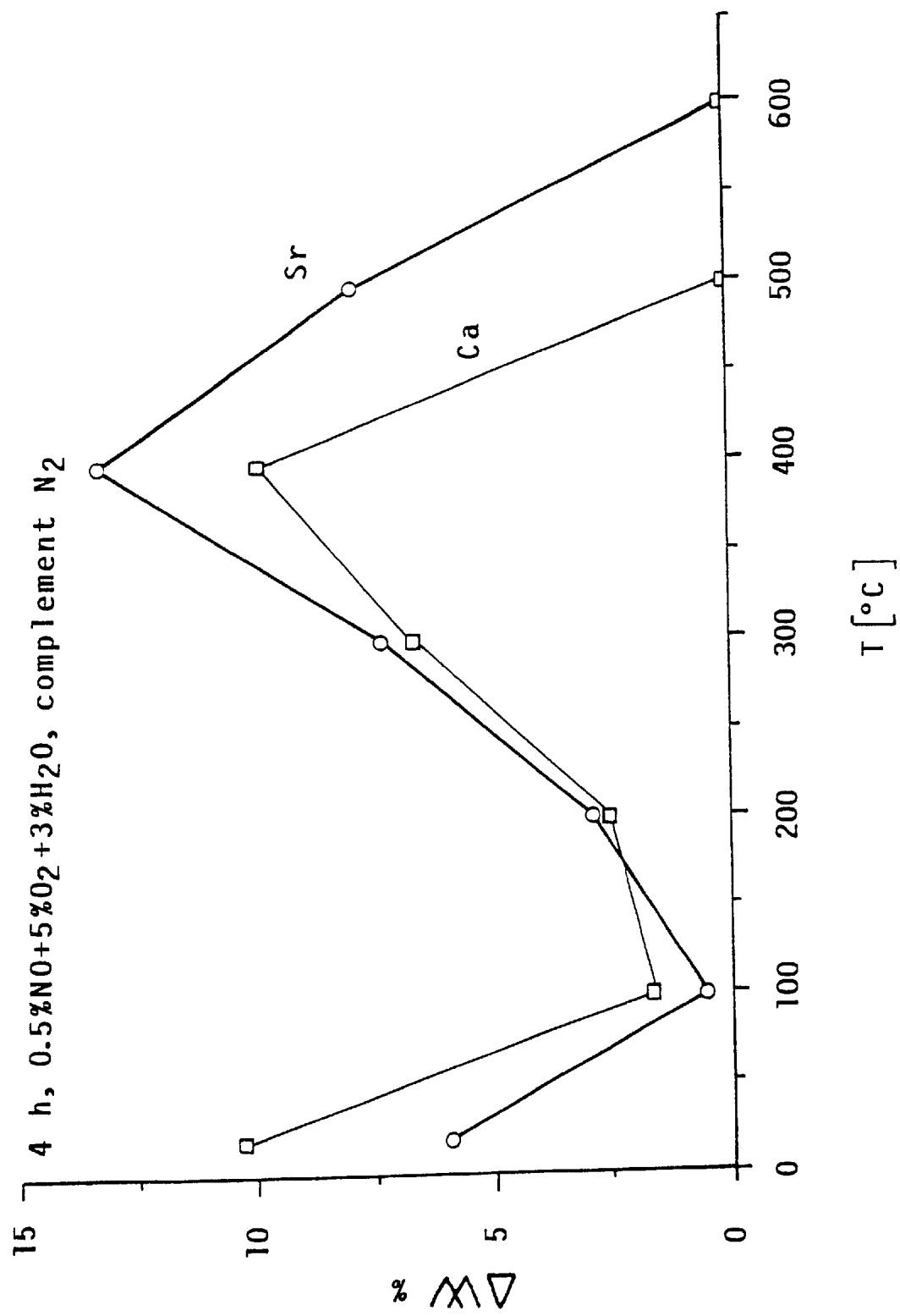

The relative weight increase ($\Delta W$ %) as a function of temperature, for four hours of exposure of the absorbent compound to the specified gas mixtures, is shown in FIGS. 1, 2 and 3 respectively.

The numeric values of $\Delta W$ are given only a semiquantitative meaning, since the extent of the absorption in isothermal conditions is regulated by the kinetics of the system, which also depends on the state of the surface of the materials. The behavior of $\Delta W$ with respect to the temperature instead points out the actual temperature intervals in which the processes that lead to nitrogen oxide absorption are active.

FIG. 1 relates to the absorption of NO from a mixture of NO plus $N_2$ inert gas. The diagram therefore shows only NO absorption. Experiments have shown that the Sr and Sr, Ca materials absorb in the interval between 150 and 400° C. and in particular between 200 and 400° C. The Ca materials absorb between 200 and 300° C.

Measurements made at 25° C. with a mixture of NO plus $N_2$ (inert) in the presence of water vapor showed that the Ca materials absorb in these conditions even at less than 100° C. and in particular even at temperatures as low as 25° C.

IR analysis of the absorbent materials unloaded from the reactor at the end of each experiment showed the formation of nitrate salts in proportion to the values of $\Delta W$. The formation of nitrate salts was also observed, indicating the presence of excess oxygen in the absorbent materials.

The samples that correspond to the measurements made at 25° C. in the presence of water vapor furthermore show modest amounts of hydrated phases.

FIG. 2 relates to absorption from a mixture of NO, $O_2$ and $N_2$. It is noted that the amount of oxygen present in the mixture is significant with respect to the typical conditions of flue gas ducts.

In this case, part of the NO is oxidated to $NO_2$. The unconverted NO and the $NO_2$ are absorbed on the absorbent compounds according to the invention, and comparison with FIG. 1 shows that the absorption of the latter gas occurs over a temperature range up to 500° C. for Sr materials and up to 400° C. for Ca materials.

Furthermore, although this is not very evident, the Ca material is active at 25° C. even in the absence of water vapor.

IR analyses of the absorbent materials unloaded from the reactor at the end of each experiment showed the formation of nitrite salts and nitrate salts in proportion to the values of $\Delta W$.

FIG. 3 relates to absorption from a mixture of NO, $O_2$ and water vapor. The amount of oxygen and water vapor is significant with respect to the typical conditions of flue gas ducts.

It is noted that the behaviors are comparable to those of FIG. 2, but the effect of water vapor in promoting NO and $NO_2$ absorption at low temperature becomes evident.

IR analyses of the absorbents unloaded from the reactor at the end of each experiment showed the formation of nitrate salts and nitrite salts in proportion to the values of $\Delta W$ and the formation of small amounts of hydrated phases.

Figure 4:
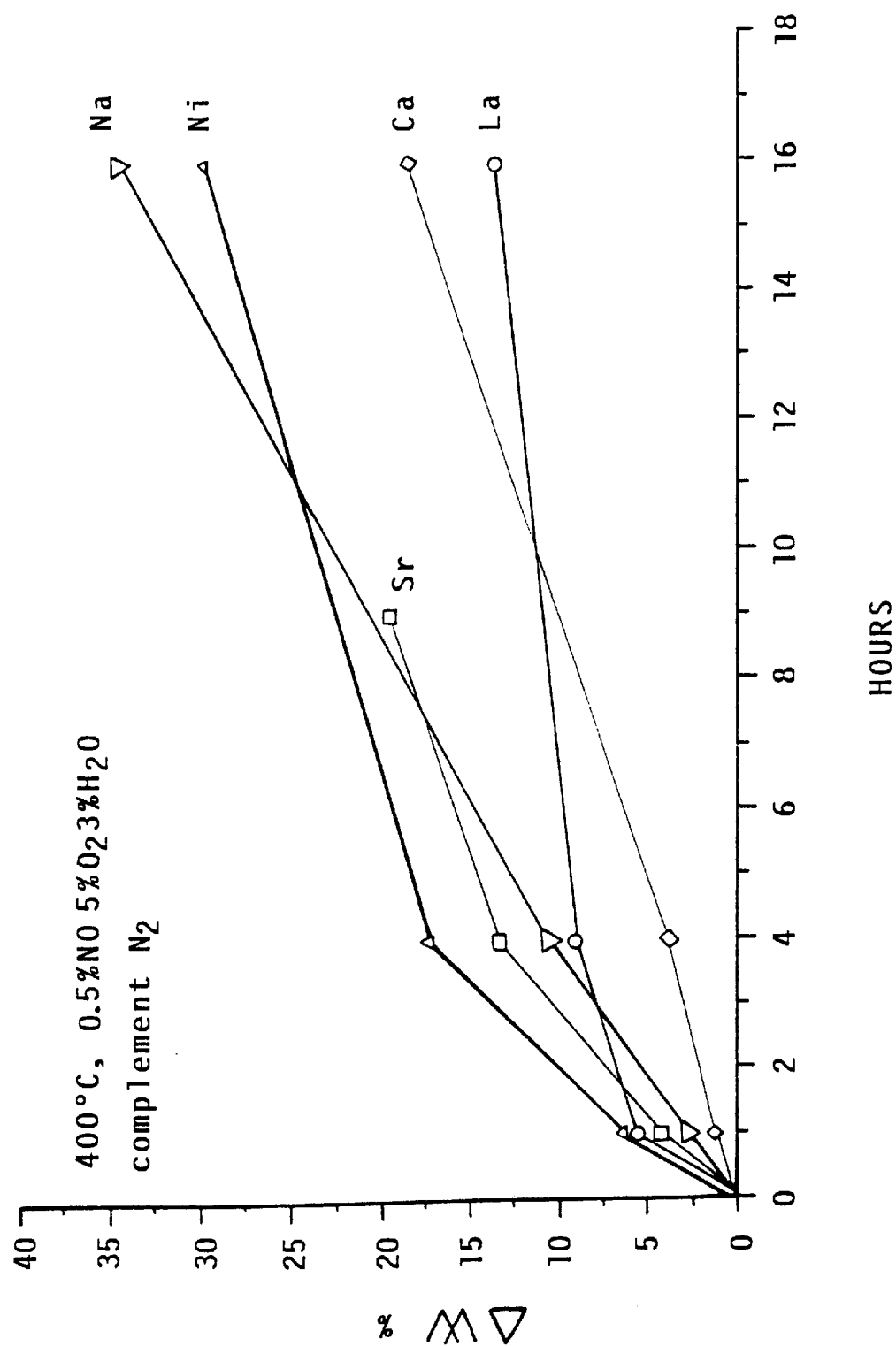

FIG. 4 relates to similar experiments conducted by using derivative compounds having a structure of the $Sr_{14}Cu_{24}O_{41}$ type as absorbent compounds.

The nominal compositions of the materials used were as follows:

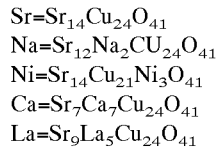

Sr=$Sr_{14}Cu_{24}O_{41}$
Na=$Sr_{12}Na_2CU_{24}O_{41}$
Ni=$Sr_{14}Cu_{21}Ni_3O_{41}$
Ca=$Sr_7Ca_7Cu_{24}O_{41}$
La=$Sr_9La_5Cu_{24}O_{41}$

Figure 5:
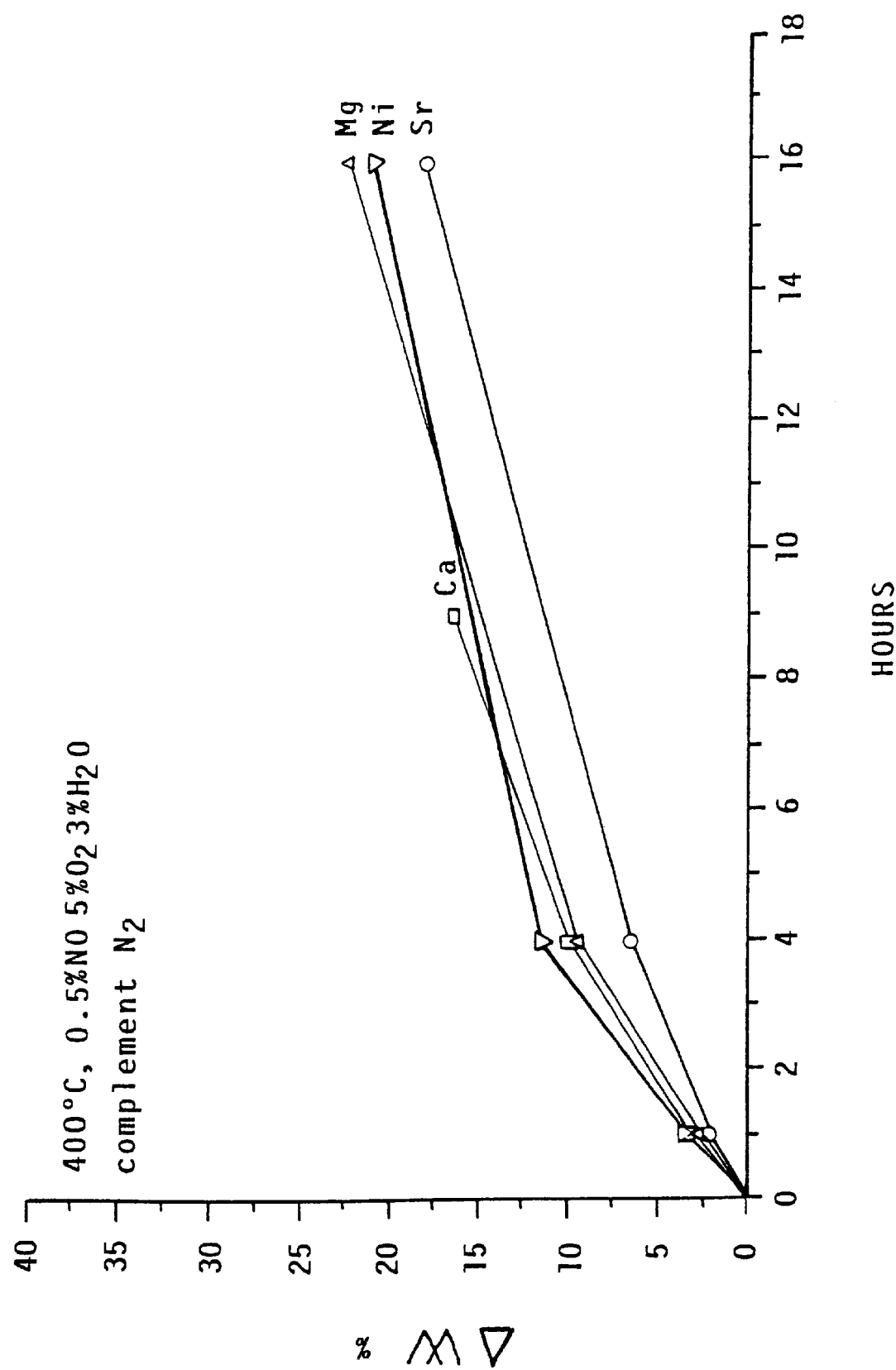

FIG. 5 relates to similar experiments conducted with absorbent compounds having a structure of the $CaCuO_2$ type.

The nominal compositions of the materials used were as follows:

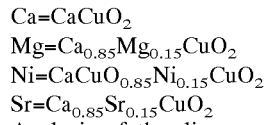

Ca=$CaCuO_2$
Mg=$Ca_{0.85}Mg_{0.15}CuO_2$
Ni=$CaCuO_{0.85}Ni_{0.15}CuO_2$
Sr=$Ca_{0.85}Sr_{0.15}CuO_2$

Analysis of the diagrams presented in FIGS. 4 and 5 shows that the substitutions performed in the $CaCuO_2$ and $Sr_{14}Cu_{24}O_{41}$ base materials produce materials having an absorption activity which is, in some cases, favorably comparable with that of the pure $CaCuO_2$ and $Sr_{14}Cu_{24}O_{41}$ materials.

B. Experiments with Temperature Ramp

In order to characterize the efficiency and reversibility of the nitrogen oxide absorption and desorption processes, the above cited gas mixtures 1), 2) and 3) were fed to a reactor containing 1 to 2 g of absorbents while the temperature of the absorbents was varied according to a linear temperature gradient of about 3° C./min.

The concentration of the gases in the stream leaving the reactor was measured by spectrographic analysis.

Figure 6:
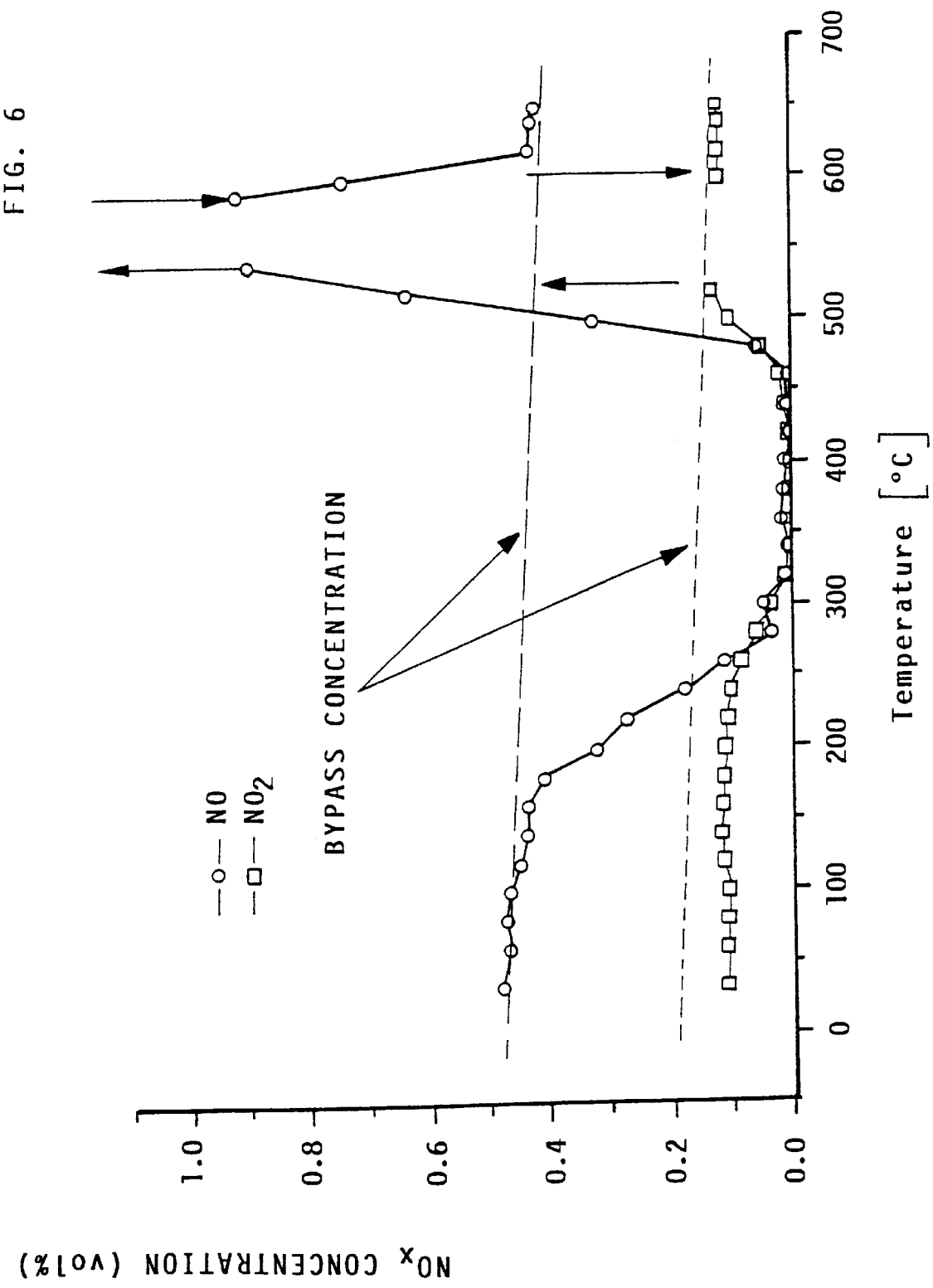
Figure 7:
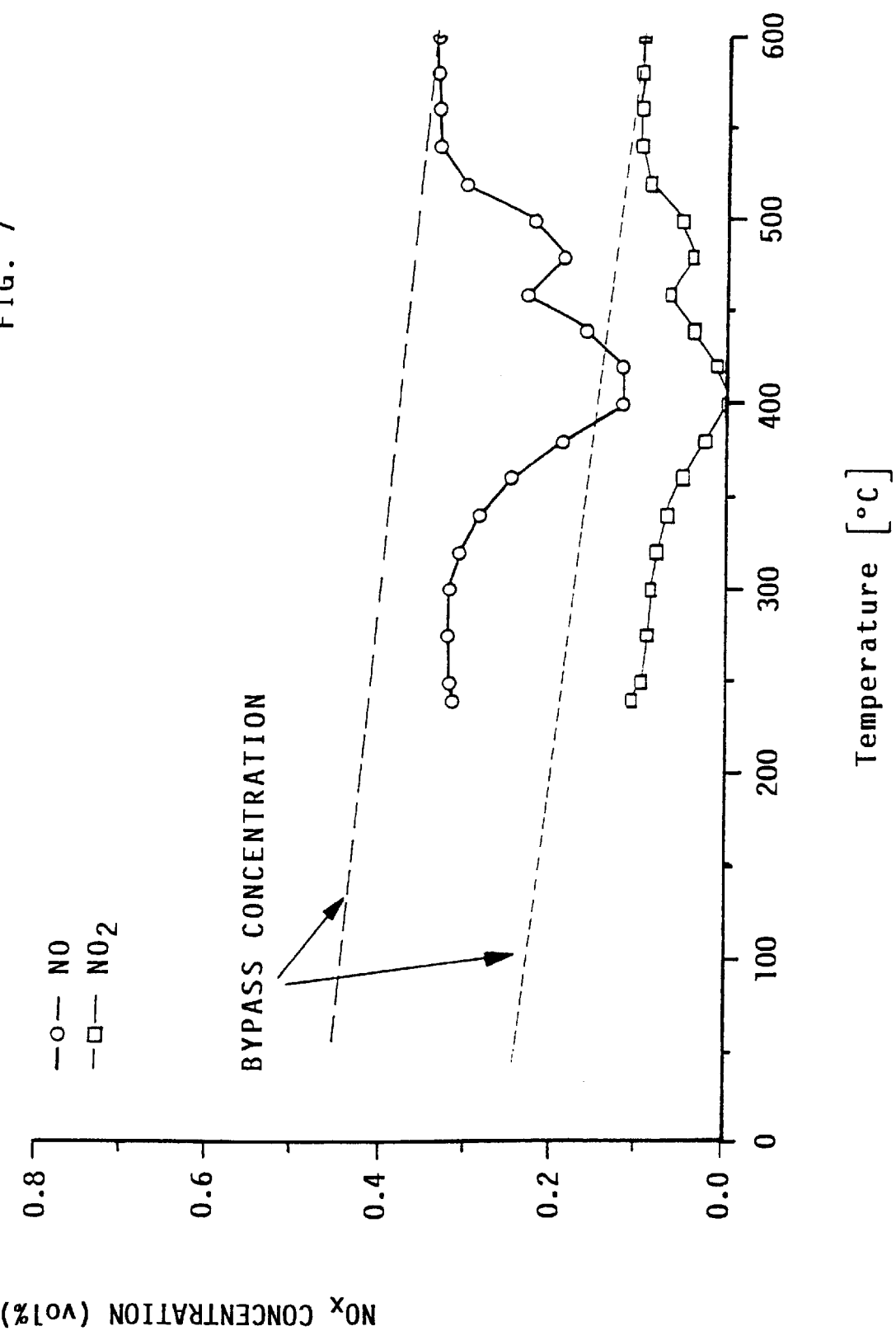
Figure 8:
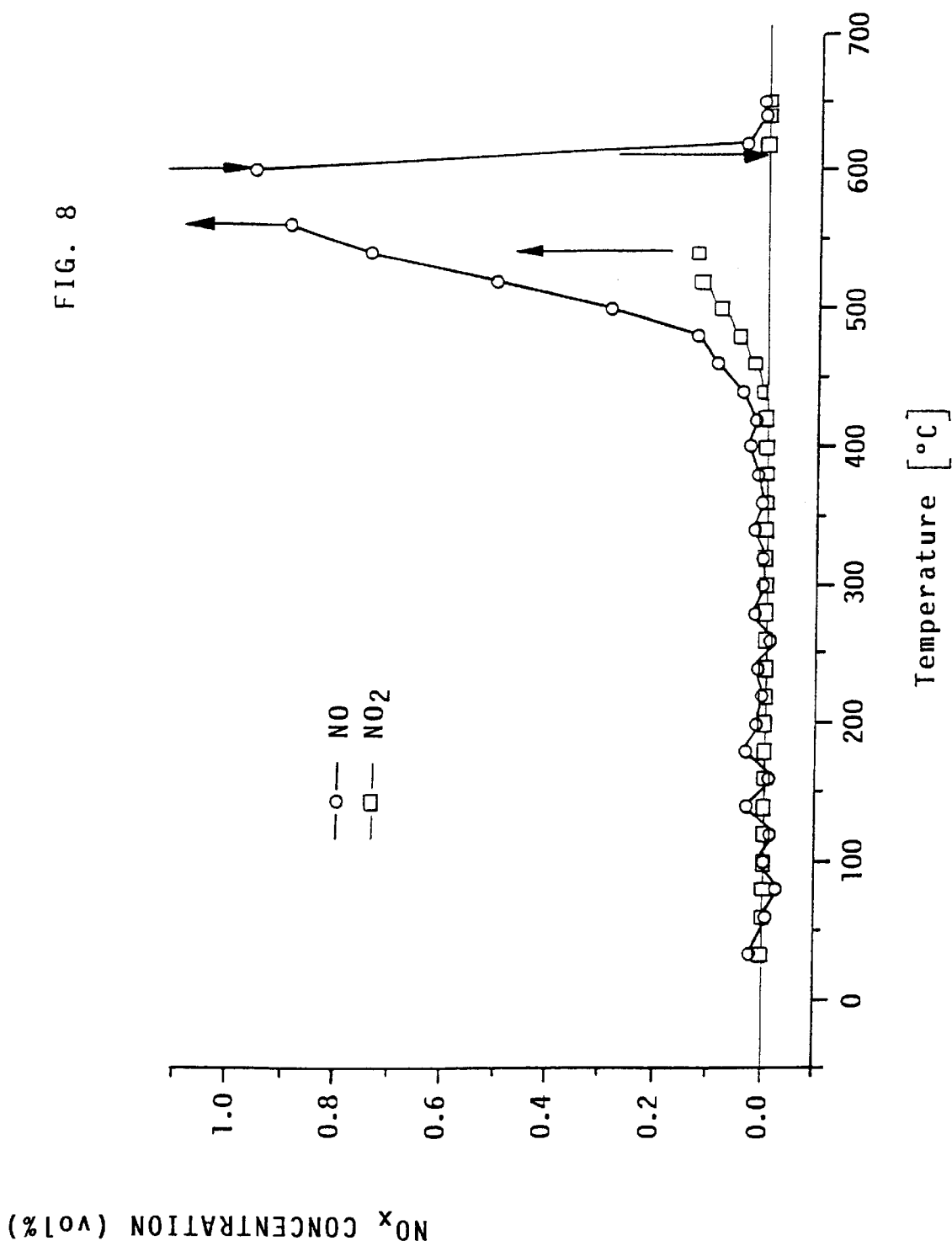

FIGS. 6 to 11 present the results of some of the experiments. FIGS. 6 to 8 relate to experiments conducted with $Sr_4Cu_{24}O_{41}$, while FIGS. 9 to 11 relate to experiments conducted with $CaCuO_2$.

Figure 9:
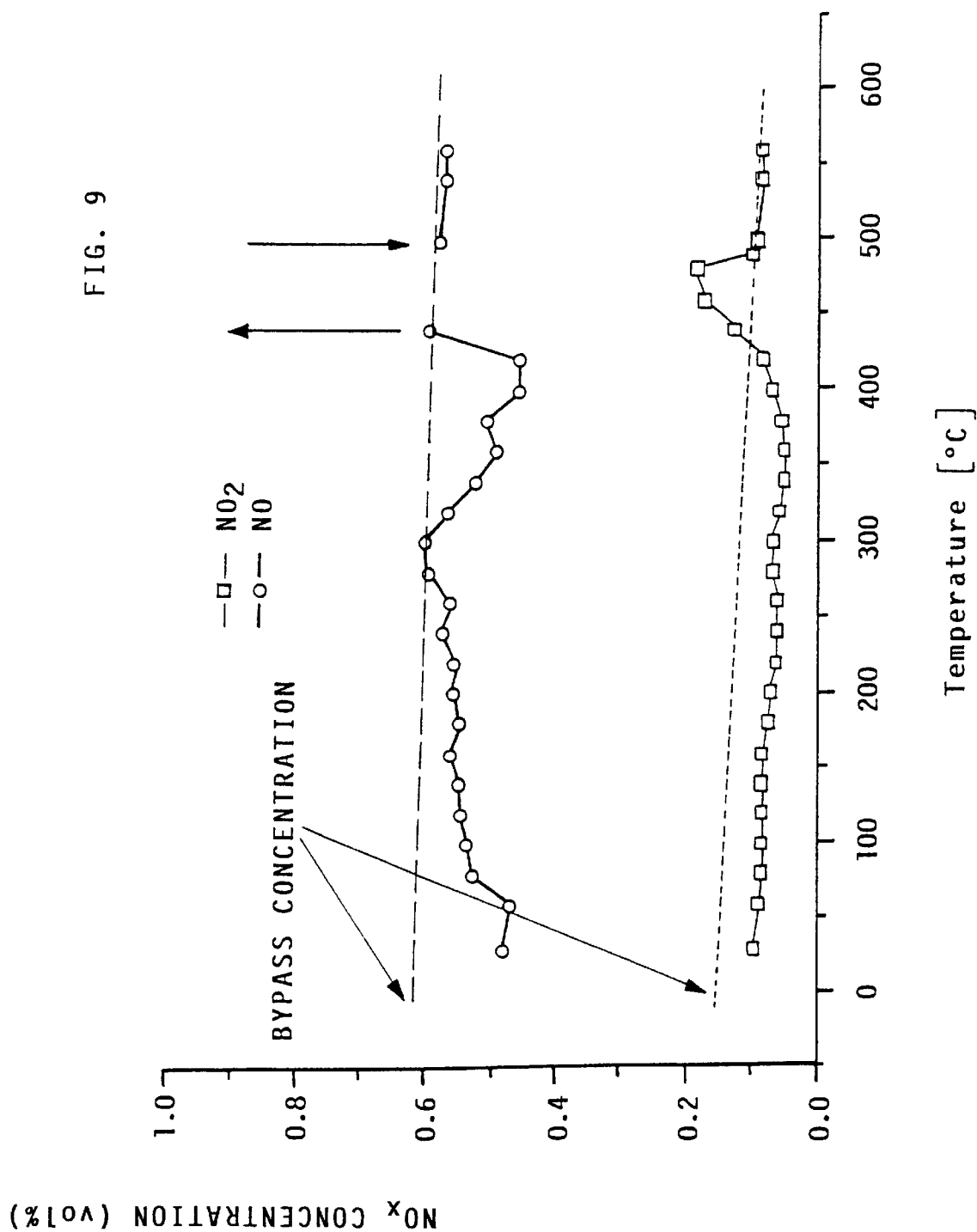
Figure 10:
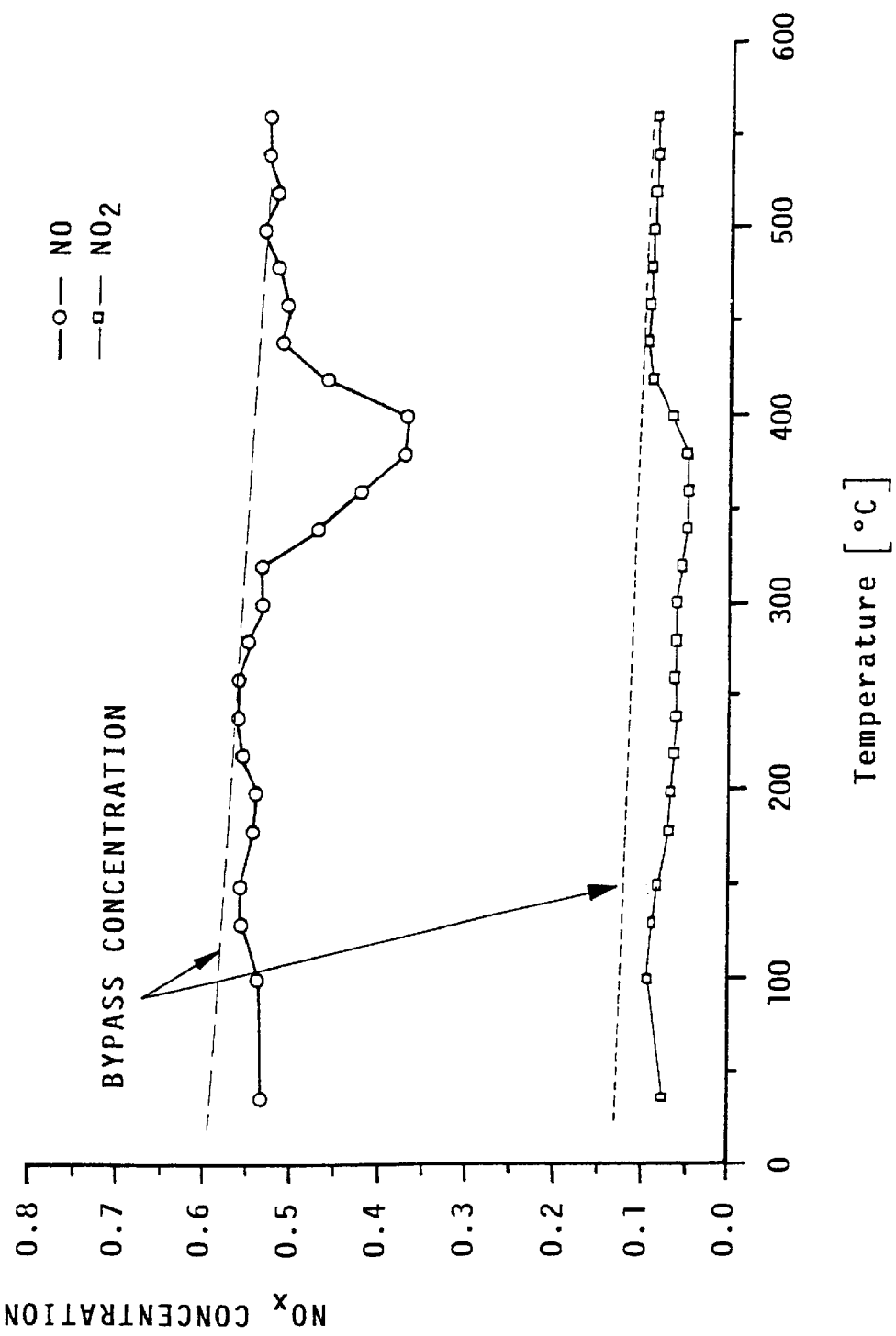
Figure 11:

The same load (1.5 g) of absorbent material was subjected in succession to the following operations:

a) Heating with a constant temperature gradient (+200° C./hour) from 20° C. to approximately 600° C. in the reactor, fed continuously with a mixture of 0.5% NO plus 5% $O_2$ plus 10% $H_2O$ plus $N_2$ complement, by weight, at a flow-rate of 150 ml/min. The results are shown in FIGS. 6 and 9.

b) Cooling from 600 to 20° C. with a constant temperature gradient (−150° C./hour), maintaining the same gas mixture supply conditions. The results are shown in FIGS. 7 and 10.

c) Heating from 20 to 650° C. (+200° C./hour), in the reactor fed continuously with a mixture of 5% $O_2$ plus 10% $H_2O$ plus $N_2$ complement, that is to say, without NO, at a flow-rate of 150 ml/min. The results are shown in FIGS. 8 and 11.

FIGS. 6, 7 and 9, 10 also plot the bypass concentrations of NO and $NO_2$ determined from experiments conducted in the same conditions as shown above for steps a) and b) but in the absence of absorbent material, that is to say, while the reactor was empty.

FIGS. 6 to 11 show the temperature ranges during which NO and $NO_2$ absorption occurs, respectively.

The results of the experiments related to the temperature ranges in which nitrogen oxide absorption occurs are given in Table 1.

It is also noted that both compounds absorb both NO and $NO_2$ formed by reaction of the NO with the oxygen contained in the gas mixture. The absorption and desorption temperatures for the two gases (NO and $NO_2$) are clearly differentiated, as shown by the data in the table.

TABLE 1

1.0% NO, $N_2$ complement

| $CaCuO_2$ | abs. | NO | 0–160° C. | | | |
| | | | 180–380° C. | abs. | $NO_2$ | n/A* |
| | des. | NO | 250–320° C. | | | |
| | | | 350–440° C. | des. | $NO_2$ | 330–560° C. |
| $Sr_{14}Cu_{24}O_{41}$ | abs. | NO | 150–360° C. | abs. | $NO_2$ | n/A |
| | des. | NO | 380–450° C. | des. | $NO_2$ | 500–600° C. |

0.8% NO, 5% $O_2$, $N_2$ complement

| $CaCuO_2$ | abs. | NO | 180–440° C. | abs. | $NO_2$ | 180–440° C. |
| | des. | NO | 270–350° C. | | | |
| | | | 390–510° C. | des. | $NO_2$ | 390–510° C. |
| $Sr_{14}Cu_{24}O_{41}$ | abs. | NO | 180–490° C. | abs. | $NO_2$ | 150–450° C. |
| | des. | NO | 420–550° C. | des. | $NO_2$ | 500–600° C. |

0.5% NO, 5% $O_2$, 3% $H_2O$, $N_2$ complement

| $CaCuO_2$ | abs. | NO | 0–160° C. | | | |
| | | | 320–420° C. | abs. | $NO_2$ | 160–420° C. |
| | des. | NO | 420–490° C. | des. | $NO_2$ | 420–520° C. |
| $Sr_{14}Cu_{24}O_{41}$ | abs. | NO | 100–460° C. | abs. | $NO_2$ | 100–480° C. |
| | des. | NO | 450–550° C. | des. | $NO_2$ | 500–600° C. |

*n/A = not applicable, because no $NO_2$ is formed.

It is also noted that the $CaCuO_2$ compound, in the presence of water, shows NO absorption activity even at very low temperatures, particularly at 25° C.

The results of the experiments shown in FIGS. 7 and 10 confirm that the absorbent material was regenerated following heating to 600° C., above the desorption temperature.

The results of the experiments presented in FIGS. 8 and 11 show that the NO and $NO_2$ gases absorbed during cooling with a constant temperature gradient (falling ramp) are desorbed by heating in the absence of an NO supply.

Experiments were also conducted in order to evaluate the saturation limit of the absorption process; selectivity tests were also performed in order to verify resistance to possible operating conditions.

Measurements performed by IR spectroscopy proved that the products of the absorption of NO and $NO_2$ by the compounds according to the invention are respectively calcium nitrite and nitrate (for $CaCuO_2$) and strontium nitrite and nitrate (for $Sr_{14}Cu_{24}O_{41}$). Accordingly, the following reactions can be assumed to occur:

1) $CaCuO_2+2NO+\frac{1}{2}O_2 => Ca(NO_2)_2+CuO$
2) $CaCuO_2+2NO_2+\frac{1}{2}O_2 -> Ca(NO_3)_2+CuO$
3) $Sr_{14}Cu_{24}O_{41}+28NO+5.5\ O_2 => 14Sr(NO_2)_2+24CuO$
4) $Sr_{14}Cu_{24}O_{41}+28NO_2+5.5\ O_2 => 14Sr(NO_3)_2+24CuO$ From these it can be deduced that the increase in weight to saturation due to $NO_x$ absorption (i.e., ignoring the variation due to the oxygen, which can partly originate from a non-stoichiometric excess in the compounds) is respectively:

1) 44%; 2) 68%; 3) 25%; 4) 38%

In order to determine the selectivity of the process of nitrogen oxide absorption by the compounds according to the invention, experiments were conducted in conditions similar to those of the experiments for which the results are given in FIGS. 1 to 3, except that a different gas mixture, containing carbon dioxide and water, was used.

Figure 12:
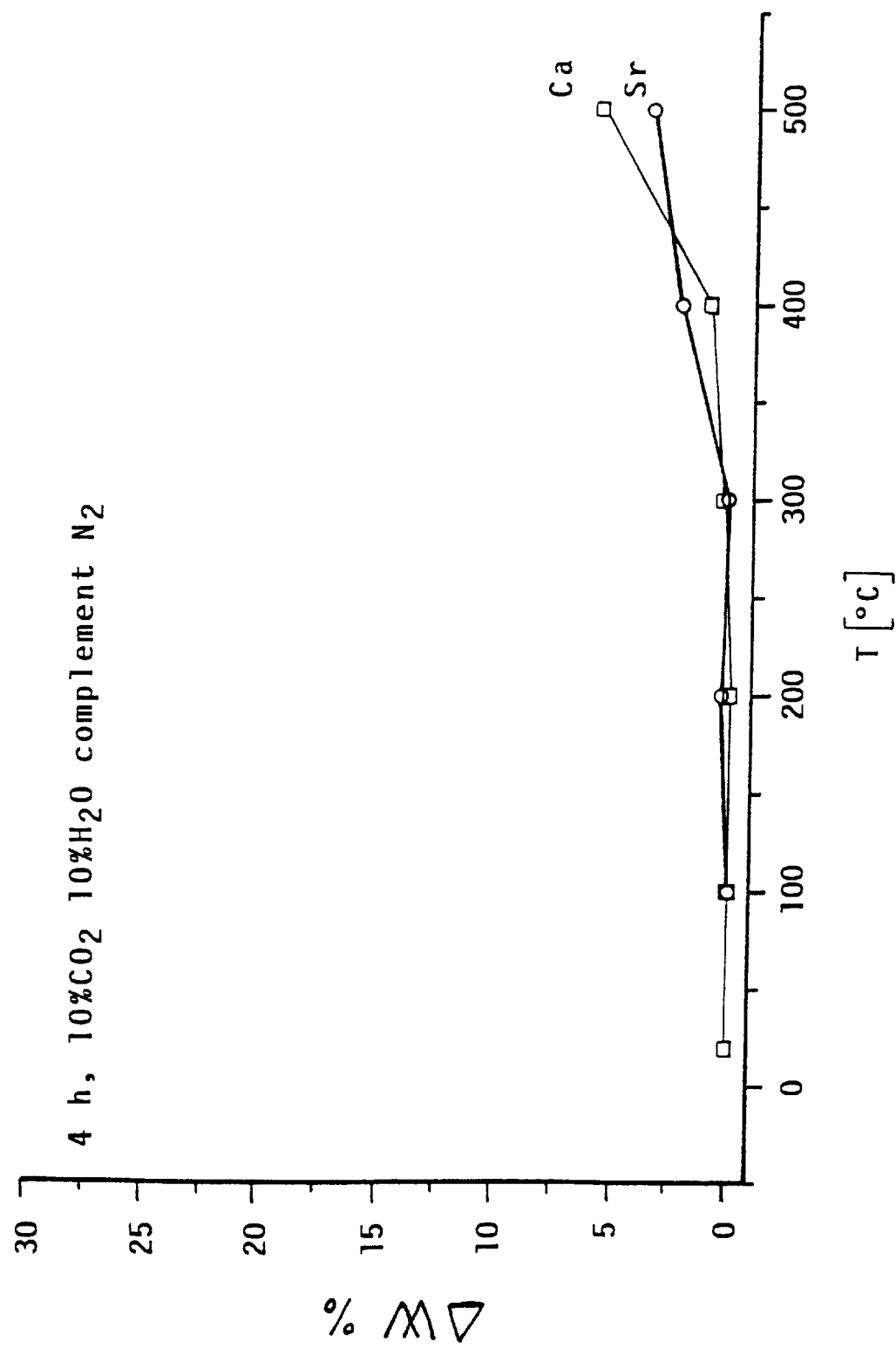

The increase in weight of the absorbent compound as a function of the temperature, as a consequence of 4 hours of exposure to the described atmosphere, is shown in FIG. 12.

FIG. 12 shows that reactivity with respect to hydration and carbonatation reactions is entirely negligible up to 350°, while at higher temperatures it becomes similar to the reactivity with respect to nitrogen oxides.

Accordingly, up to 350° C. the selectivity of the absorbent compounds according to the invention with respect to NO and $NO_2$ is to be considered as being total.

Furthermore, it has been found surprisingly that the $CaCuO_2$ compound has NO and $NO_2$ absorption capacity at ambient temperature.

Figure 13:
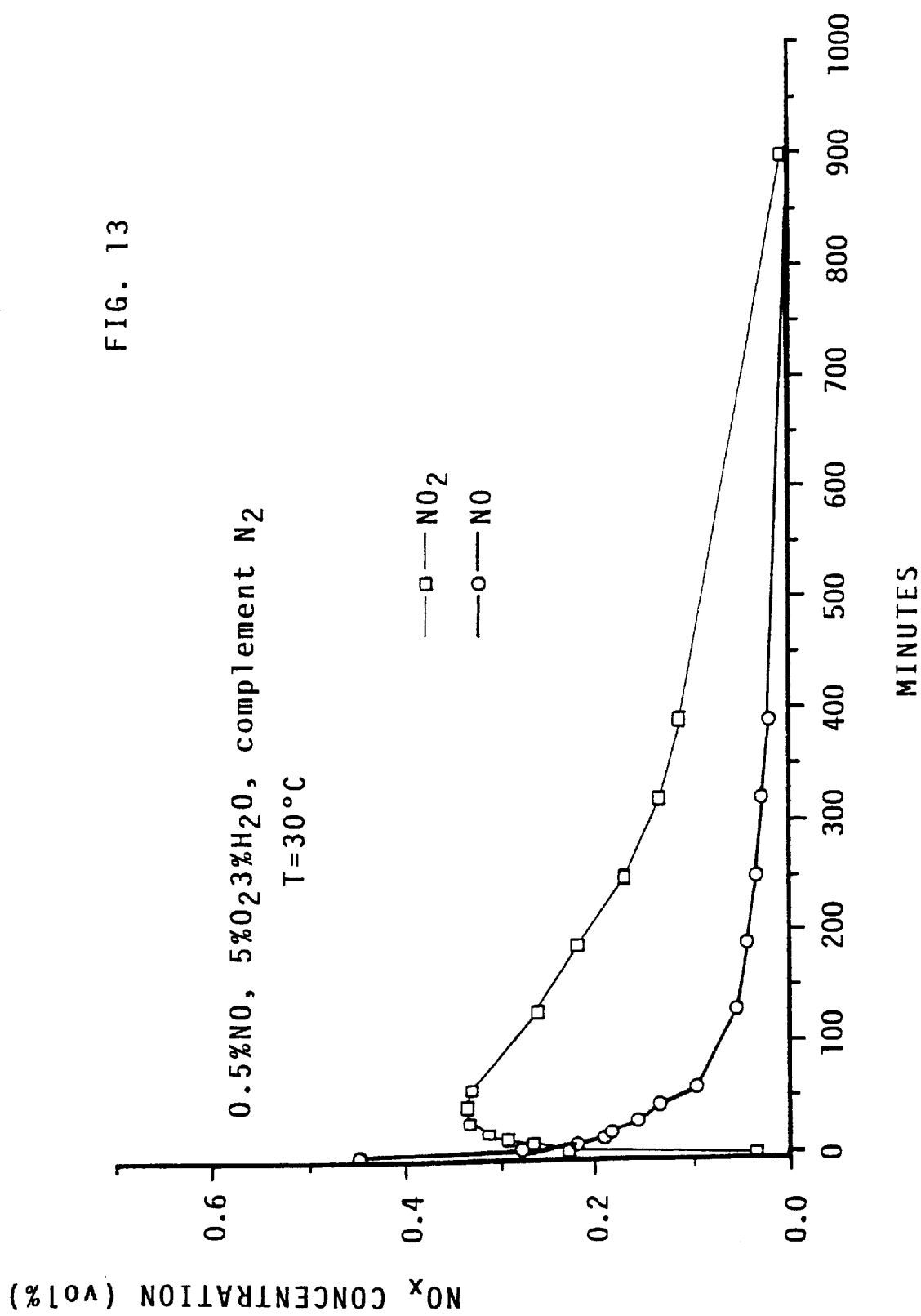

The results of experiments conducted with a closed reactor containing $CaCuO_2$ absorbent material in an atmosphere of 1% NO, 5% $O_2$, 3% $H_2O$ and $N_2$ complement are shown in FIG. 13.

Experiments conducted with the $CaCuO_2$ and $Sr_{14}Cu_{24}O_{41}$ compounds and with their isovalent- and heterovalent-substitution derivatives in comparison with experiments conducted with barium-based compounds have pointed out important aspects which make $CaCuO_2$ and $Sr_{14}Cu_{24}O_{41}$ compounds and their derivatives advantageous.

Their maximum activity, regarding both absorption and desorption of NO and $NO_2$, is in fact shifted toward low temperatures, allowing, for an equal level of efficiency, once the synthesis and forming processes have been optimized, to use these materials at lower temperatures. This also entails the advantage of working in safe conditions with respect to the various processes characterized by oxide materials.

The lower regeneration temperatures are an important technological advantage and so is the absence of delicate problems in terms of coexistence of phases which occur in the synthesis of barium-based compounds.

The possibility to absorb NO at ambient temperature, albeit with reduced (slower) kinetics, is an important opportunity for practical application, since this property is not known so far for any other material. Furthermore, $CaCuO_2$ and $Sr_{14}Cu_{24}O_{41}$ are capable of absorbing large amounts of $NO_2$, particularly when the process is performed in the presence of water vapor.

In addition, due to the abundance of their constituents and to their easier synthesis, the cost of the compounds used as absorbents in the present invention is significantly lower than that of barium-based compounds.

As will be evident to experts in the field, various modifications, adaptations and variations of the above specific description can be introduced without moving away from the teachings of the present invention.

The disclosures in Italian Patent Application No.BO98A000593 from which this application claims priority are incorporated herein by reference.

What is claimed is:

1. A process for absorbing nitrogen oxides, comprising the step of contacting gas mixtures containing nitrogen oxides with absorbent compounds constituted by mixed copper oxides chosen among $CaCuO_2$, $Sr_{14}Cu_{24}O_{41}$, derivatives thereof obtained by isovalent and/or heterovalent substitutions, and mixtures thereof.

2. The process according to claim 1, wherein absorption occurs in the presence of oxygen.

3. The process according to claim 1, wherein absorption occurs in the presence of water vapor.

4. The process according to claim 1, wherein said absorbent compound is $CaCuO_2$.

5. The process according to claim 1, wherein absorption occurs at a temperature ranging between 0 and 420° C.

6. The process according to claim 5, wherein absorption occurs at a temperature between 0–160 and 290–420° C.

7. The process according to claim 4, wherein absorption occurs at ambient temperature.

8. The process according to claim 1, wherein said absorbent compound is $Sr_{14}Cu_{24}O_{41}$.

9. The process according to claim 8, wherein absorption occurs at a temperature ranging between 100 and 490° C.

10. The process according to claim 1, wherein the absorbent compound is a derivative obtained by isovalent and/or heterovalent substitution of the compound $Sr_{14}Cu_{24}O_{41}$.

11. The process according to claim 10, wherein said absorbent compound is a derivative of $Sr_{14}Cu_{24}O_{41}$ obtained by substitution on the sites occupied by Sr.

12. The process according to claim 11, wherein up to 50% of the Sr atoms are substituted with Ca.

13. The process according to claim 11, wherein the absorbent compound is selected from the group consisting of:

$Sr_{12}Na_2Cu_{24}O_{41}$, $Sr_7Ca_7Cu_{24}O_{41}$ and $Sr_9La_5Cu_{24}O_{41}$.

14. The process according to claim 1, wherein the absorbent compound is a derivative obtained by isovalent and/or heterovalent substitution of the compound $CaCuO_2$.

15. The process according to claim 14, wherein said absorbent compound is a derivative of $CaCuO_2$ obtained by substitution on the sites occupied by Ca.

16. The process according to claim 15, wherein the absorbent compound is selected from the group consisting of:

$Ca_{0.85}Mg_{0.15}CuO_2$ and $Ca_{0.85}Sr_{0.15}CuO_2$.

17. The process according to claim 1, wherein said absorbent compound is a derivative of $CaCuO_2$ or $Sr_{14}Cu_{24}O_{41}$ obtained by isovalent and/or heterovalent substitution on the sites occupied by Cu.

18. The process according to claim 17, wherein said derivative is selected from the group consisting of $Sr_{14}Cu_{21}Ni_3O_{41}$ and $CaCu_{0.85}Ni_{0.15}O_2$.

19. The process according to claim 10, wherein absorption occurs at a temperature ranging between 0 and 500° C.

20. The process according to claim 9 wherein absorption occurs at a temperature of 340–400° for NO and 280–460° or $NO_2$.

21. The process according to claim 11 wherein said absorbent compound is obtained by substitution with Ca, La or Na.

22. The process according to claim 15 wherein said absorbent compound is obtained by substitution with Mg or Sr.

* * * * *